United States Patent
Erskine et al.

(10) Patent No.: US 7,555,818 B2
(45) Date of Patent: Jul. 7, 2009

(54) RELEASABLE FASTENER ASSEMBLY AFFIXABLE THROUGH A PANEL

(75) Inventors: Edward J. Erskine, Benson, NY (US); Andrew S. Furlong, Johnstown, NY (US)

(73) Assignee: Taylor Made Group, Inc., Gloversville, NY (US)

(*) Notice: Subject to any disclaimer, the term of this patent is extended or adjusted under 35 U.S.C. 154(b) by 0 days.

(21) Appl. No.: 10/944,008

(22) Filed: Sep. 20, 2004

(65) Prior Publication Data

US 2006/0062653 A1    Mar. 23, 2006

(51) Int. Cl.
*A44B 17/00* (2006.01)
(52) U.S. Cl. .................. 24/305; 24/379.1; 411/371.2; 411/372
(58) Field of Classification Search ........... 411/511, 411/542; 16/2.1; 52/304; 24/671, 94, 95, 24/96

See application file for complete search history.

(56) References Cited

U.S. PATENT DOCUMENTS

| | | | | |
|---|---|---|---|---|
| 570,872 A * | 11/1896 | Gardner | .................... | 24/105 |
| 1,590,890 A | 6/1926 | Easterman | | |
| 2,125,372 A * | 8/1938 | Fox | ................ | 52/204.52 |
| 2,302,740 A * | 11/1942 | Boicey | ............... | 52/204.52 |
| 2,672,107 A * | 3/1954 | Widman | ............... | 52/489.1 |
| 3,140,115 A | 7/1964 | Bliss | | |
| 3,186,049 A * | 6/1965 | Fiddler | ................ | 24/290 |
| 3,399,589 A * | 9/1968 | Breed | ................ | 411/428 |
| 3,548,410 A | 12/1970 | Parker | | |
| 3,709,553 A * | 1/1973 | Churchill et al. | ............ | 296/145 |
| 3,887,960 A * | 6/1975 | Sherman | ................ | 16/2.2 |
| 4,001,894 A | 1/1977 | Roques-Rogery | | |
| 4,033,535 A * | 7/1977 | Moran | .................. | 248/56 |
| 4,050,120 A * | 9/1977 | Yamaguchi | ............... | 411/511 |
| 4,085,964 A * | 4/1978 | Hutto et al. | ................. | 296/91 |
| 4,109,957 A | 8/1978 | Polizzi et al. | | |
| 4,142,758 A | 3/1979 | Scaife | | |
| 4,174,596 A | 11/1979 | Deibele | | |
| 4,180,899 A * | 1/1980 | Mikosinski | ............... | 29/512 |
| 4,295,766 A * | 10/1981 | Shaw | ................ | 411/113 |
| 4,310,273 A * | 1/1982 | Kirrish | ................ | 411/338 |
| 4,491,990 A * | 1/1985 | Robinson et al. | ............. | 4/607 |
| 4,567,703 A * | 2/1986 | Ricks | ................ | 52/204.52 |
| 4,581,868 A * | 4/1986 | McCann | ............... | 52/204.593 |
| 4,587,784 A * | 5/1986 | Chavy et al. | ............. | 52/204.52 |
| 4,656,689 A * | 4/1987 | Dennis | ................ | 16/2.2 |

(Continued)

OTHER PUBLICATIONS http://www.polymicro-cc.com/site/pdf/POLYMICRO-materials_poly-v-glass.pdf.*

*Primary Examiner*—Jack W. Lavinder
(74) *Attorney, Agent, or Firm*—Nixon & Vanderhye P.C.

(57) ABSTRACT

A releasable fastener assembly is affixable through a panel having a front side and a back side and a mounting hole therethrough. The releasable fastener assembly includes a mounting button attachable to the panel back side, the mounting button having a button shaft sized to fit into the mounting hole and a button head with a diameter larger than the mounting hole. A seal may be fit between the mounting button and the panel back side. One part of a releasable fastener is attachable to the panel front side and has an aperture therein in alignment with the mounting hole. A fixing member secures the one part and the mounting button to each other through the panel.

6 Claims, 1 Drawing Sheet

U.S. PATENT DOCUMENTS

| | | | | |
|---|---|---|---|---|
| 4,680,206 A * | 7/1987 | Yoxon et al. | | 428/34 |
| 4,741,461 A * | 5/1988 | Williamson et al. | | 222/181.2 |
| 4,866,895 A | 9/1989 | Hlavaty | | |
| 4,869,454 A * | 9/1989 | Byrne et al. | | 248/610 |
| 4,878,792 A * | 11/1989 | Frano | | 411/339 |
| 4,929,505 A * | 5/1990 | Washburn et al. | | 428/408 |
| 4,934,887 A * | 6/1990 | Sharp et al. | | 411/339 |
| 5,012,600 A | 5/1991 | Wang | | |
| 5,069,586 A * | 12/1991 | Casey | | 411/339 |
| 5,106,250 A * | 4/1992 | Fischer et al. | | 411/107 |
| 5,170,985 A * | 12/1992 | Killworth et al. | | 248/635 |
| 5,193,960 A * | 3/1993 | Fukushima et al. | | 411/542 |
| 5,236,272 A * | 8/1993 | Hibbard | | 403/24 |
| 5,353,472 A * | 10/1994 | Benda et al. | | 16/2.2 |
| 5,441,095 A | 8/1995 | Trethewey | | |
| 5,464,261 A * | 11/1995 | Alkhoury | | 292/251 |
| 5,642,959 A * | 7/1997 | Greferath | | 403/388 |
| 5,647,710 A * | 7/1997 | Cushman | | 411/397 |
| 5,772,380 A * | 6/1998 | Cloud et al. | | 411/508 |
| 5,778,599 A | 7/1998 | Saito | | |
| 5,947,052 A * | 9/1999 | Deising | | 114/361 |
| 5,950,277 A * | 9/1999 | Tallmadge et al. | | 16/2.1 |
| 6,119,305 A * | 9/2000 | Loveall et al. | | 16/2.2 |
| 6,233,782 B1 * | 5/2001 | Regele et al. | | 16/2.1 |
| 6,244,807 B1 * | 6/2001 | Garcia | | 411/369 |
| 6,374,455 B1 * | 4/2002 | Regele et al. | | 16/2.1 |
| 6,415,462 B1 | 7/2002 | Perry | | |
| 6,467,225 B1 | 10/2002 | Shimomura | | |
| 6,488,460 B1 * | 12/2002 | Smith et al. | | 411/353 |
| 6,553,728 B1 * | 4/2003 | Zurn | | 52/171.3 |
| 6,592,285 B1 * | 7/2003 | Schwarz | | 403/179 |
| 6,632,056 B1 * | 10/2003 | Lind | | 411/107 |
| 6,705,635 B2 * | 3/2004 | Hoeft et al. | | 280/728.2 |
| 6,705,814 B2 * | 3/2004 | Dobson | | 411/533 |
| 6,757,945 B2 * | 7/2004 | Shibuya et al. | | 24/662 |
| 6,758,625 B1 * | 7/2004 | Lawrence | | 403/388 |
| 6,768,058 B2 * | 7/2004 | Pallapothu | | 174/652 |
| 6,941,721 B2 * | 9/2005 | Lind | | 52/786.13 |
| 2003/0138307 A1 * | 7/2003 | Lind | | 411/34 |
| 2003/0145437 A1 * | 8/2003 | Medgyes | | 24/290 |
| 2004/0068943 A1 * | 4/2004 | Morgan et al. | | 52/235 |
| 2004/0078926 A1 * | 4/2004 | May et al. | | 16/2.1 |
| 2004/0091332 A1 * | 5/2004 | Kuntze | | 411/107 |
| 2005/0188634 A1 * | 9/2005 | Bolton et al. | | 52/235 |

* cited by examiner

RELEASABLE FASTENER ASSEMBLY AFFIXABLE THROUGH A PANEL

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The present invention relates to a releasable fastener assembly and, more particularly, to a releasable fastener assembly affixable through materials that are not particularly suitable for such constructions.

It is desirable to secure fasteners such as snaps and the like to glass surfaces so that objects cooperable with the attached releasable fastener can be easily attached and detached to/from the glass. In one exemplary application, one part of a fastener may be secured via an adhesive to a top portion of a boat windshield, while a fabric cover or the like including a complement fastener is easily attachable and detachable to the windshield.

Securing the fastener via adhesive, however, has a number of drawbacks. In particular, the adhesive bonded fastener parts are difficult to repair/replace in the field. Additionally, problems may arise in precisely locating the fastener parts. Still further, the process required for applying the adhesive and securing the fastener parts may require clamping and other apparatus and may result in a lower quality or messy appearance.

BRIEF SUMMARY OF THE INVENTION

It would thus be desirable to provide an assembly enabling a releasable fastener to be easily and precisely secured to a surface such as glass and the like. Additionally, it would be beneficial if the assembly was easily repaired in the field and the location and clamping problems associated with gluing were eliminated.

The assembly of the invention enables a releasable fastener to be secured to a panel such as a glass panel via a hole in the panel.

In an exemplary embodiment of the invention, a releasable fastener assembly is affixable through a panel having a front side and a back side and a mounting hole therethrough. The releasable fastener assembly includes a mounting button attachable to the panel back side, where the mounting button has a button shaft sized to fit into the mounting hole and a button head with a diameter larger than the mounting hole. A seal may be fit between the mounting button and the panel back side. One part of a releasable fastener is attachable to the panel front side and has an aperture therein in alignment with the mounting hole. A fixing member secures the one part, the seal (if included) and the mounting button to one another through the panel. The seal preferably is an O-ring seal having a diameter smaller than the button head. The button head may include a channel therein shaped to receive the O-ring seal.

In one arrangement, the releasable fastener comprises a snap assembly, and the one part is one of a male part of the snap assembly or a female part of the snap assembly. The mounting button may include a threaded hole within the button shaft, and in which case the fixing member is a screw sized to be threaded into the threaded hole. The mounting button may alternatively include an unthreaded hole into which the fixing member is screwed.

In another exemplary embodiment of the invention, a method of securing a releasable fastener assembly to a panel having a front side and a back side includes the steps of forming a mounting hole through the panel; providing a mounting button having a button shaft sized to fit into the mounting hole and a button head with a diameter larger than the mounting hole; inserting the button shaft into the mounting hole; providing one part of a releasable fastener having an aperture therein, and providing a fixing member sized to fit through the aperture; aligning the aperture of the one part with the mounting hole on the front side of the panel; and securing with the fixing member the one part, the seal and the mounting button to one another through the panel. A seal may be fit over the button shaft such that the seal is disposed between the button head and the back side of the panel.

In still another exemplary embodiment of the invention, a releasable fastener assembly is securable through a hole in a panel and includes one part of a releasable fastener having an aperture therein, and a mounting button having a button shaft with a threaded hole therein. A fixing screw is extendable through the aperture of the one part and into the threaded hole of the button shaft, where the fixing screw is sized to secure the one part and the mounting button on opposite sides of the panel.

BRIEF DESCRIPTION OF THE DRAWINGS

These and other aspects and advantages of the present invention will be described in detail with reference to the accompanying drawings, in which.

DETAILED DESCRIPTION OF THE INVENTION

Figure 1:
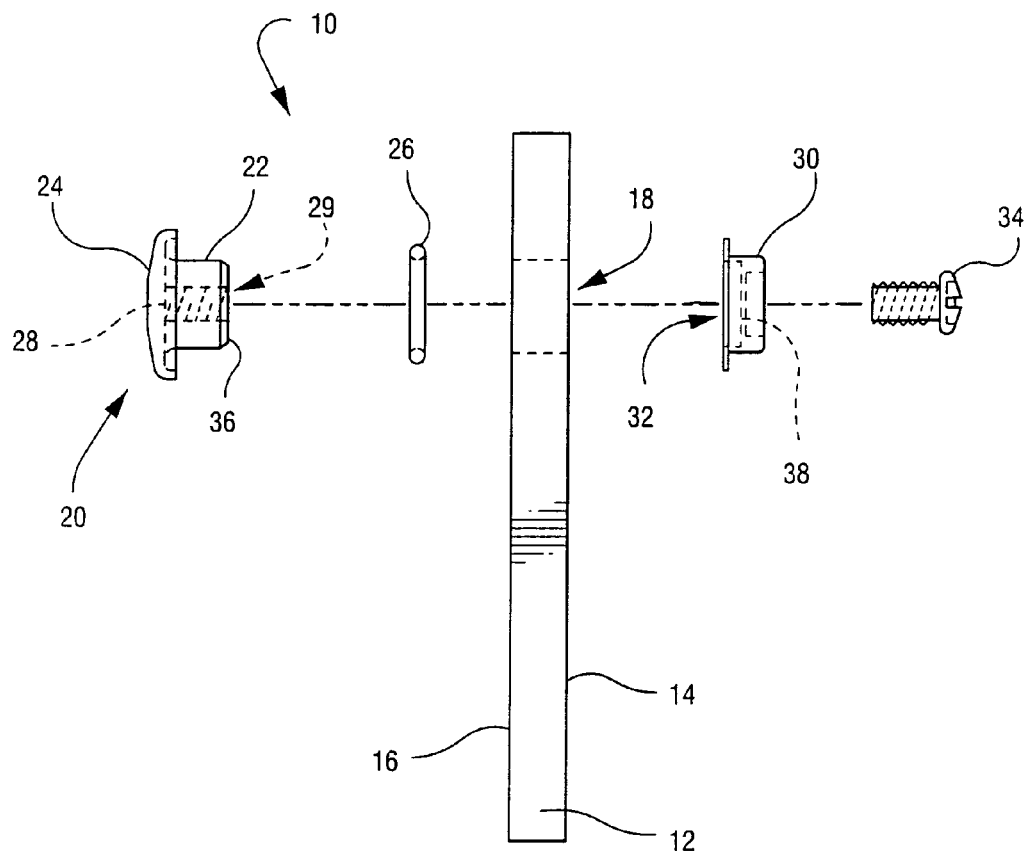
FIG. 1 is an assembly drawing of the releasable fastener assembly according to the present invention.

FIG. 1 is an exploded assembly drawing of the releasable fastener assembly 10 according to the present invention. As shown, the exemplary releasable fastener part is shown as a portion of a snap assembly. Such an assembly, however, is exemplary as those of ordinary skill in the art will appreciate other suitable releasable fastener parts for the application of the present invention, and the invention is thus not necessarily meant to be limited to the illustrated example. Moreover, the releasable fastener assembly 10 of the invention could be affixed through any material with a suitably sized hole therein. A preferred application, however, is for those materials that are not typically suited for direct attachment, such as glass, acrylic, or other suitable sheet goods.

With continued reference to FIG. 1, the releasable fastener assembly 10 of the present invention is affixable through a panel 12 having a front side 14 and a back side 16. A mounting hole 18 is formed through the panel by any suitable means such as drilling or the like.

The releasable fastener assembly 10 includes a mounting button 20 shown attachable to the panel back side 16. The mounting button 20 includes a button shaft 22 sized to fit into the mounting hole 18 and a button head 24 with a diameter larger than the mounting hole 18. A seal 26, preferably an O-ring seal, is sized to fit over the button shaft 22. In a preferred arrangement, the button head 24 is provided with a channel 28 therein that is shaped to receive the seal 26. Additionally, the button shaft 22 includes a hole 29 therein, which may or may not be a threaded hole (threads shown in phantom in FIG. 1).

One part 30 of a releasable fastener is attachable to the panel front side 14 and preferably includes an aperture 32 therein generally disposed in alignment with the mounting hole 18. As noted, the part 30 of the releasable fastener as shown in FIG. 1 may either be a male part of a snap assembly or a female part of a snap assembly. Other releasable fasteners may alternatively be used. A fixing member 34, such as an assembly screw, is inserted through the aperture 32 in the releasable fastener part 30 and into the hole 29 in the button shaft 22. The fastener 34 may be threaded (as shown in phantom in FIG. 1) to engage threaded hole 29 or may be securable in unthreaded hole 29 via suitable means. The fastener 34 thus secures the fastener part 30, the seal 26 and the mounting button 20 to one another through the panel 12. In one alternative embodiment, the aperture 32 of the one part 30 may be eliminated, and the fixing member 34 may be formed integral with the one part 30.

To further facilitate assembly, the button shaft 22 may terminate at a stepped portion 36, and a corresponding receiving portion 38 is formed adjacent the releasable fastener aperture 32.

Figure 2:
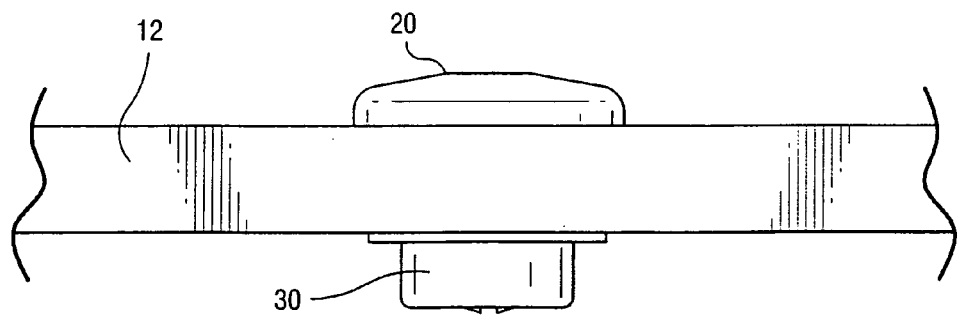
FIG. 2 is a side view of the releasable fastener assembly secured through a glass panel.

FIG. 2 shows the releasable fastener assembly 10 of the invention affixed to a glass or acrylic panel 12. With this configuration, an attaching product incorporating the fastener complement to the fastener part 30 of the assembly 10 can be easily attached and detached to/from the panel 12. Moreover, assembly repair is made easier, while the initial assembly does not require clamps or the like or leave a messy low-quality appearance.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A releasable fastener assembly affixable through a panel having a front side and a back side and a mounting hole therethrough, the releasable fastener assembly comprising:
    a mounting button attachable to the panel back side, the mounting button having a button shaft sized to fit into the mounting hole and a button head with a diameter larger than the mounting hole;
    one part of a snap assembly attachable to the panel front side and having an aperture therein, the one part being positioned relative to the mounting button and the panel to be engageable with a complementary part of the snap assembly on the panel front side;
    a fixing member securing the one part and the mounting button to each other through the panel, the fixing member engaging the button shaft through the aperture of the snap assembly one part from the panel front side; and
    a seal shaped to fit between the mounting button and the panel back side, wherein the fixing member secures the one part, the seal and the mounting button to one another through the panel.

2. A releasable fastener assembly according to claim 1, wherein the seal comprises an O-ring seal having a diameter smaller than the button head.

3. A releasable fastener assembly according to claim 2, wherein the button head comprises a channel therein shaped to receive the O-ring seal.

4. A releasable fastener assembly securable through a hole in a panel, the releasable fastener assembly comprising:
    a mounting button having a button shaft with a hole therein;
    one part of a snap assembly having an aperture therein;
    a fixing screw extendable through the aperture of the one part and into the hole of the button shaft, the fixing screw being sized to secure the one part and the mounting button on opposite sides of the panel, the fixing screw engaging the hole of the button shaft through the aperture of the snap assembly one part from the one part side of the panel; and
    a seal placeable between at least one of the one part and the panel and between the mounting button and the panel, wherein the one part is positioned relative to the mounting button and the panel to be engageable with a complementary part of the snap assembly on the one part side of the panel.

5. A releasable fastener assembly according to claim 4, wherein the seal comprises an O-ring seal sized to fit over the button shaft.

6. A releasable fastener assembly affixable through a panel having a front side and a back side and a mounting hole therethrough, the releasable fastener assembly comprising:
    a mounting button attachable to the panel back side, the mounting button having a button shaft sized to fit into the mounting hole and a button head with a diameter larger than the mounting hole;
    one part of a snap assembly positioned relative to the mounting button and the panel to be engageable with a complementary part of the snap assembly on the panel front side;
    a fixing member securing the one part and the mounting button to each other through the panel from the panel front side; and
    a seal shaped to fit between the mounting button and the panel back side.

* * * * *